(12) United States Patent
Egami

(10) Patent No.: US 8,419,591 B2
(45) Date of Patent: Apr. 16, 2013

(54) VEHICLE DRIVE SYSTEM

(75) Inventor: Tsuneyuki Egami, Gamagori (JP)

(73) Assignee: Denso Corporation, Kariya (JP)

( * ) Notice: Subject to any disclaimer, the term of this patent is extended or adjusted under 35 U.S.C. 154(b) by 763 days.

(21) Appl. No.: 12/621,737

(22) Filed: Nov. 19, 2009

(65) Prior Publication Data
US 2010/0137098 A1 Jun. 3, 2010

(30) Foreign Application Priority Data

Dec. 2, 2008 (JP) ................................ 2008-307218

(51) Int. Cl.
*B60W 10/02* (2006.01)
*B60W 10/08* (2006.01)

(52) U.S. Cl.
USPC .............................................. 477/5; 477/110

(58) Field of Classification Search .......... 475/5; 477/3, 477/5, 107, 111, 110; 903/910, 918
See application file for complete search history.

(56) References Cited

U.S. PATENT DOCUMENTS

| | | | |
|---|---|---|---|
| 5,722,502 A | 3/1998 | Kubo | |
| 5,862,497 A | 1/1999 | Yano et al. | |
| 6,302,227 B1 | 10/2001 | Takemura et al. | |
| 2007/0021259 A1* | 1/2007 | Tenberge | 475/5 |
| 2008/0236917 A1* | 10/2008 | Abe et al. | 180/65.4 |
| 2010/0056312 A1* | 3/2010 | Akutsu et al. | 475/1 |
| 2010/0120579 A1* | 5/2010 | Kawasaki | 477/3 |

FOREIGN PATENT DOCUMENTS

| | | |
|---|---|---|
| JP | 2-003745 | 1/1990 |
| JP | P2002-139136 A | 5/2002 |
| JP | 2003-200743 | 7/2003 |
| JP | P2003-341387 A | 12/2003 |
| JP | P2004-182101 A | 7/2004 |
| JP | P2007-270923 A | 10/2007 |

OTHER PUBLICATIONS

Japanese Office Action dated Aug. 2, 2012, issued in corresponding Japanese Application No. 2008-307218 with English translation.

* cited by examiner

*Primary Examiner* — David D Le
*Assistant Examiner* — Huan Le
(74) *Attorney, Agent, or Firm* — Nixon & Vanderhye P.C.

(57) ABSTRACT

In a drive system of a vehicle, the drive power of an engine is divided by a planetary gear set to drive two power transfer shafts. One of the two shafts includes a continuously variable transmission unit and a clutch. The output sides of the two shafts are coupled to a common power output shaft, which is coupled to an AC motor. In a power transfer condition of the clutch, the vehicle is driven with only the output drive power of the engine or both drive powers of the engine and the AC motor. In a power interruption condition of the clutch, the vehicle is driven with only the drive power of the AC motor. The kinetic energy generated at deceleration of the vehicle is converted into electric energy by the AC motor thereby to perform regenerative braking.

7 Claims, 8 Drawing Sheets

VEHICLE DRIVE SYSTEM

CROSS REFERENCE TO RELATED APPLICATION

This application is based on and incorporates herein by reference Japanese Patent Application No. 2008-307218 filed on Dec. 2, 2008.

FIELD OF THE INVENTION

The present invention relates to a vehicle drive system, which has an internal combustion engine and an electric motor/generator as a drive power source of a vehicle.

BACKGROUND OF THE INVENTION

Demand for electric vehicles is increasing in recent years because of social requirements for lower fuel consumption and lower exhaust emissions.

In one of commercially available electric vehicles, as disclosed in the following patent document 1 for example, an internal combustion engine is coupled through a power dividing device (for example, planetary gear set and the like) to a first motor (electric motor/generator) provided primarily as a generator and a second motor provided primarily as a motor to drive wheels. The vehicle is driven in an engine operation mode (1), an EV operation mode (2) and a regenerative braking mode (3). In the engine operation mode (1), the vehicle is driven with only the drive power from the engine or both drive powers from the engine and the motor. In the EV operation mode (2), the vehicle is driven with only the drive power from the motor with the engine being stopped. In the regenerative braking mode (3), the kinetic energy generated at the deceleration or braking of the vehicle is converted into the electric energy, which is charged into a battery.

The drive system according to patent document 1, however, needs two systems, each of which includes a motor, an inverter and the like. The drive system therefore results in a large-sized, high-cost system. It is therefore not suited to a small- or compact-sized, low-cost vehicle, in which a system mounting space is limited.

In another electric vehicle, as disclosed in the following patent document 2, only one motor is directly coupled to the output shaft of an internal combustion engine to reduce costs. In this drive system, the vehicle is driven solely by the engine as engine-only operation or driven jointly by the engine and the motor as assist operation.

The drive system according patent document 2, however, cannot perform EV operation or regenerative braking efficiently, because the motor is directly coupled to the output shaft of the engine and hence influenced by the friction loss of the engine.

In another electric vehicle, as disclosed in the following patent document 3, a motor is coupled to the output shaft of an internal combustion engine through a clutch. In this system, the engine and the motor are engaged or disengaged by the clutch so that an EV operation or regenerative braking may be performed efficiently.

The drive system according the patent document 3, however, needs a large-sized clutch, which can receive the whole drive power from the engine, because the clutch is coupled to the output shaft of the engine. Further, because the engine, the clutch, the motor and the transmission unit are all coupled in series, the power transfer path becomes lengthy and is not suited to be mounted in small- or compact-sized vehicles.

In a still another electric vehicle, as disclosed in the following patent document 4, a planetary gear set is interposed between an internal combustion engine and a motor. The output shaft of the engine is directly coupled to a sun gear of the planetary gear set. The rotary shaft of the motor and the input shaft of a continuously variable transmission unit are coupled to a carrier of the planetary gear set. The drive power of the engine and the motor are transferred to wheels of the vehicle through the continuously variable transmission unit so that engine operation (engine-only operation or assist operation), an EV operation and regenerative braking may be performed.

The drive system according to the patent document 4, however, needs a large-sized continuously variable transmission unit, which can receive all the drive power from both the engine and the motor, because the drive power from the engine and the motor is transferred to the wheel side through the continuously variable transmission unit. As a result, it is not suited to be mounted in small- or compact-sized vehicles.

Patent document 1: U.S. Pat. No. 5,722,502 (JP 9-46821A)
Patent document 2: U.S. Pat. No. 5,862,497 (JP 9-280085A)
Patent document 3: JP 2003-200743A
Patent document 4: U.S. Pat. No. 6,302,227 (JP 2000-219055A)

SUMMARY OF THE INVENTION

It is therefore an object of the present invention to provide a vehicle drive system, which selectively performs engine operation, EV operation, regenerative braking and the like while attaining reduction in size and cost.

According to one aspect of the present invention, a vehicle drive system is configured with an internal combustion engine, a drive power regulator mechanism provided in a drive power transfer path between the engine and a drive axle of a vehicle, an electric motor/generator provided to transfer and receive drive power to and from the drive axle, respectively, a power source provided to transfer and receive electric power to and from the motor/generator, respectively, and a control unit provided to control the engine, the regulator mechanism and the motor/generator based on an operating condition of the vehicle. The regulator mechanism includes a drive power divider unit, a transmission unit and a switching unit. The divider unit divides a drive power from the engine into a first transfer path of drive power and a second transfer path of drive power. The transmission unit varies a transmission ratio between an input side and an output side of the first transfer path. The switching unit turns on and off transfer of the drive power in the first transfer path and the second transfer path. The output sides of the first transfer path and the second transfer path are coupled to an output shaft in common. A rotation speed of an input side of the first transfer path and a rotation speed of the output shaft are restricted by the transmission ratio when the switching unit is in a power transfer condition, and released from restriction by the transmission ratio when the switching unit is in a power interruption condition. The control unit is configured to control a power transfer/interruption condition of the switching unit based on a required drive power from the engine.

According to the vehicle drive system, by controlling the switching unit such as a clutch to the power transfer condition, in which the first transfer path or the second transfer path is coupled, the drive power from the engine is transferred to the drive axle via the power regulator mechanism. Thus, the vehicle is driven by the drive power from only the engine or the drive powers from both the engine and the motor/generator.

By controlling the switching unit to the power interruption condition, in which the first transfer path or the second transfer path is interrupted, the transfer of the drive power between the engine and the drive axle is interrupted. Thus, the vehicle travels in an EV operation mode, in which the vehicle is driven by only the drive power from the motor/generator without the drive power from the engine. The vehicle travels in a regenerative braking mode, in which the kinetic energy of the vehicle generated at the time of deceleration or braking is converted into electric power by the motor/generator to be charged into a battery efficiently without being influenced by friction loss of the engine.

The transmission unit and the switching unit receive only a part of the drive power of the engine divided by the divider unit. Thus, the transmission unit and the switching unit can be reduced in size, and the power regulator mechanism can be shortened. With the reduction in size and cost, the vehicle drive system can be mounted even in small- or compact-sized vehicles.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
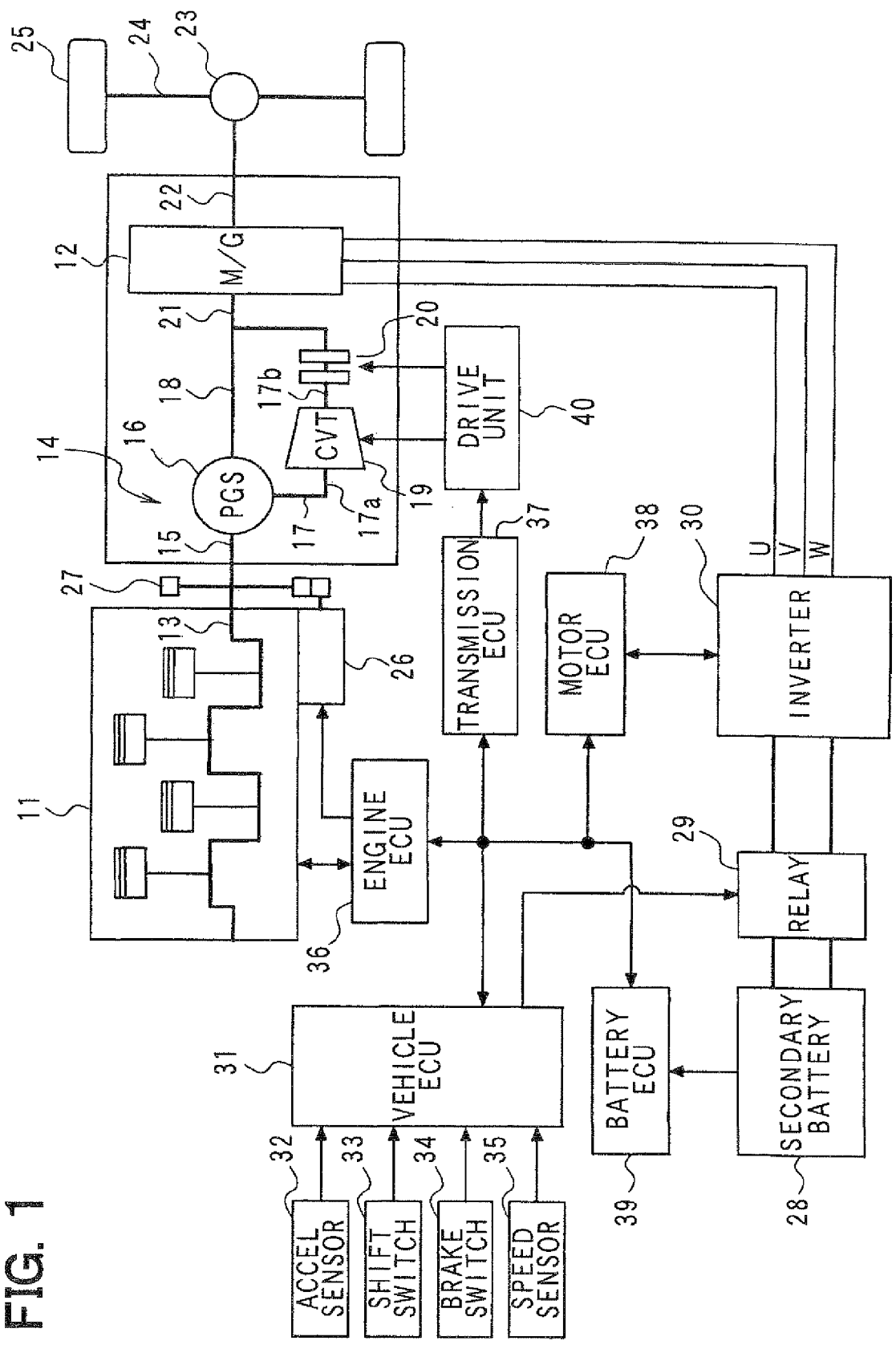
FIG. 1 is a schematic diagram showing a vehicle drive system according to one embodiment of the present invention.

A drive system for a vehicle according to the present invention will be described in more detail with respect to one embodiment shown in the drawings.

Referring first to FIG. 1, in which the drive system is provided in an electric vehicle, an internal combustion engine 11 and a three-phase AC motor (motor/generator) 12 are mounted as a drive power source of the vehicle. The crankshaft 13 of the engine 11 is coupled to the input shaft 15 of a transmission unit (power regulation mechanism) 14. A planetary gear set (drive power divider unit) 16 is coupled to the input shaft 15. The planetary gear set 16 is configured with a sun gear, planetary gears and a ring gear, which are not shown. The planetary gears are coupled to the input shaft 15 of the transmission unit 14 (that is, the crankshaft 13 of the engine 11) through a carrier (not shown). The sun gear is coupled to a first drive power transfer shaft (first path of drive power transfer) 17. The ring gear is coupled to a second drive power transfer shaft (second path of drive power transfer) 18. The transmission unit 14 is thus configured to be able to divide the output drive power from the engine 11 into the first drive power transfer shaft 17 and the second drive power transfer shaft 18 through the planetary gear set 16.

In the first drive power transfer shaft 17, a continuously variable transmission unit (CVT) 19, which is a speed change unit, and a clutch (switching unit) 20 are provided. The CVT 19 is configured to continuously vary the transmission ratio between the input side and the output side of the first drive power transfer shaft 17. The clutch 20 is configured to transfer or interrupt transfer of the drive power of the first drive power transfer shaft 17 by engaging or disengaging the input side and the output side thereof. The output side of the first drive power transfer shaft 17 and the output side of the second drive power transfer shaft 18 of the transmission unit 14 are coupled to a common output shaft 21 so that the two output sides rotate at the same rotation speed.

Thus, when the clutch 20 is turned on to the drive power transfer condition, in which the first drive power transfer shaft 17 is coupled to the output shaft 21, the rotation speed of the input side of the first drive power transfer shaft 17 and the rotation speed of the output shaft 21 are restricted by the transmission ratio of the CVT 19. When the clutch 20 is turned off to the drive power interruption condition, in which the first drive power transfer shaft 17 is disengaged from the output shaft 21, the restriction on the rotation speed by the transmission ratio of the CVT 19 is released.

The output shaft 21 of the transmission unit 14 is coupled to the rotation shaft of the AC motor 12 and a propeller shaft (drive axle) 22 so that the drive power of the propeller shaft 22 may be transferred to the wheels 25 of the vehicle through a differential gear 23, a wheel axle 24 and the like. The crankshaft 13 of the engine 11 is further coupled to a starting unit 27 so that the engine 11 may be cranked by a starter 26.

A three-phase inverter 30 is connected to a secondary battery 28 through a relay 29. The inverter 30 is provided to convert the DC electric power of the secondary battery 28 into the three-phase AC power to drive the AC motor 12 or to convert the three-phase AC power generated by the AC motor 12 operating as the AC generator into the DC power to charge the secondary battery 28.

A vehicle ECU (electronic control unit) 31 is provided to control comprehensively the entire operation of the vehicle by detecting vehicle operation conditions of the vehicle from output signals of various sensors and switches such as an accelerator sensor 32, a shift switch 33, a brake switch 34 and a vehicle speed sensor 35. The accelerator sensor 32 detects an accelerator operation (accelerator pedal position). The shift switch 33 detects shift lever positions (for example, forward drive position, rear drive position, parking position, neutral position and the like). The brake switch 34 detects braking operation. The vehicle speed sensor 35 detects a travel speed of the vehicle. The vehicle ECU 31 is configured to transmit and receive control signals and data signals to and from an engine ECU 36, a transmission ECU 37, a motor ECU 38 and a battery ECU 39. The engine ECU 36 is configured to control the operation of the engine 11. The transmission ECU 14 is configured to control the transmission unit 14 (CVT 19 and clutch 20) by controlling a drive section 40. The motor ECU 38 is configured to control the AC motor 12 by controlling an inverter 30. The battery ECU 39 is configured to monitor charge/discharge of the secondary battery 28. Thus, the ECUs 36 to 38 control the engine 11, the transmission unit 14 and the AC motor 12 in accordance with the operation conditions of the vehicle.

For example, the output drive power of the engine 11 is transferred to the propeller shaft 22 through the transmission unit 14 by turning on the clutch 20 to the drive power transfer condition. Thus, the vehicle is driven in an engine-only operation mode, in which the vehicle travels by only the drive power of the engine 11, or in an assist operation mode, in which the vehicle travels by both drive powers from the engine 11 and the AC motor 12.

On the other hand, the drive power of the engine 11 is interrupted from being transferred to the propeller shaft 22 by turning off the clutch 20 to the drive power interruption condition. Thus, the vehicle is driven in an EV (electric vehicle) operation mode, in which the vehicle travels by only the drive power from the AC motor 12 by stopping the engine 11, or in a regenerative braking mode, in which the kinetic energy generated by deceleration or braking of the vehicle is converted into electric power to be restored to the Secondary battery 28. The vehicle can travel in these modes without being influenced by the friction loss of the engine 11.

Figure 2:
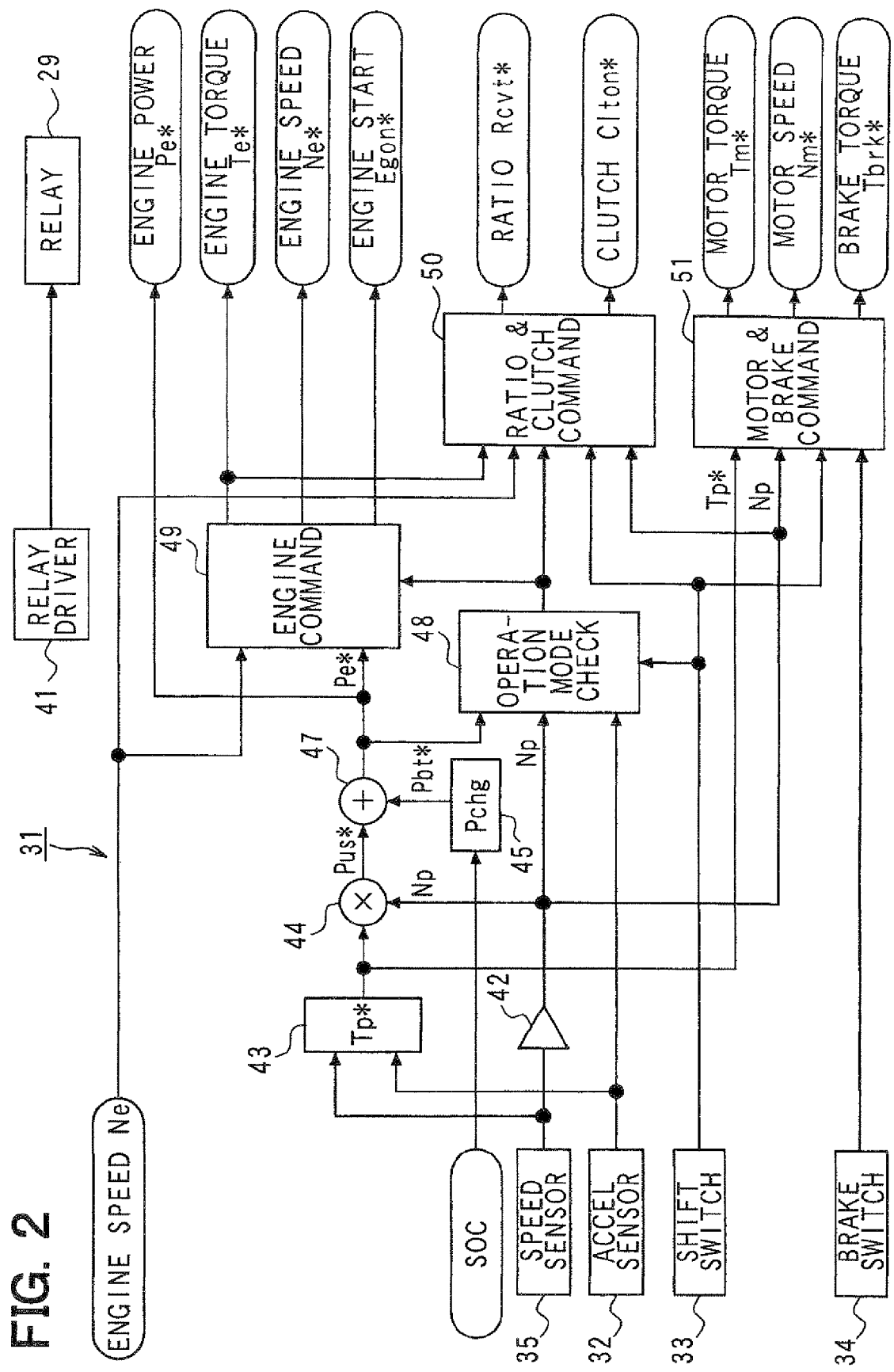
FIG. 2 is a block diagram showing a drive control part of the drive system.

The vehicle ECU 31 is configured as shown in FIG. 2. Specifically, when an ignition switch (not shown) for the engine 11 is turned on, the vehicle ECU 31 turns on the relay 29 by a relay driver section 41 after checking system conditions to thereby supply the DC power of the secondary battery 28 to the inverter 30.

In the vehicle ECU 31, a propeller shaft rotation speed calculation section 42 is provided to calculate the propeller shaft rotation speed Np of the propeller shaft 22 based on the output of the vehicle speed sensor 35. A propeller shaft torque command value calculation section 43 is provided to calculate a propeller shaft torque command value Tp* based on the vehicle travel speed detected by the vehicle speed sensor 35 (or the propeller shaft rotation speed Np), the accelerator position Accel detected by the accelerator sensor 32 and the like by using mapped data or mathematical equations.

A travel power command value calculation section 44 is provided to calculate a travel power command value Pus* required for vehicle travel based on the propeller shaft torque command value Tp* and the propeller shaft rotation speed Np and the like by using mapped data or mathematical equations. A charge power command value calculation section 45 calculates a charge power command value Pbt* required for charging the secondary battery 28 based on the state of charge SOC (=remaining energy/fully charged energy) of the secondary battery 28 by using mapped data or mathematical equations. An engine power command value calculation section 47 is provided to calculate an engine power command value Pe* (power required to engine) by adding the charge power command value Pbt* to the travel power command value Pus*.

An operation mode check section 48 is provided to check, based on the engine power command value Pe*, the propeller shaft rotation speed Np, the accelerator position Accel, the shift lever position and the like, whether the vehicle is in the engine operation mode or the EV operation mode. The engine operation mode includes the engine-only operation mode or the assist mode.

An engine operation command section 49 is provided to calculate an engine torque command value Te*, an engine rotation speed command value Ne* and an engine start command signal Egon* based on the operation mode, the engine rotation speed Ne, the engine power command value Pe* and the like.

A transmission ratio and clutch command value section 50 is provided to calculate a transmission ratio command value Rcvt* of the CVT 19 and a clutch command signal Clton* based on the operation mode, the engine rotation speed Ne, the engine torque command value Te*, the shift lever position, the propeller shaft rotation speed Np and the like.

A motor operation and mechanical brake command section 51 is provided to calculate a motor torque command value Tm*, a motor rotation speed command value Nm* and a mechanical brake torque command value Tbrk* based on the propeller shaft torque command value Tp*, the propeller shaft rotation speed Np, the shift lever position, the brake operation condition and the like.

The vehicle ECU 31 outputs these control command values and control command signals to the other ECUs 36 to 38, so that the other ECUs 36 to 38 controls the engine 11, the transmission unit 14 (CVT 19 and clutch 20), the AC motor 12, the brake device (not shown) and the like.

Figure 3:
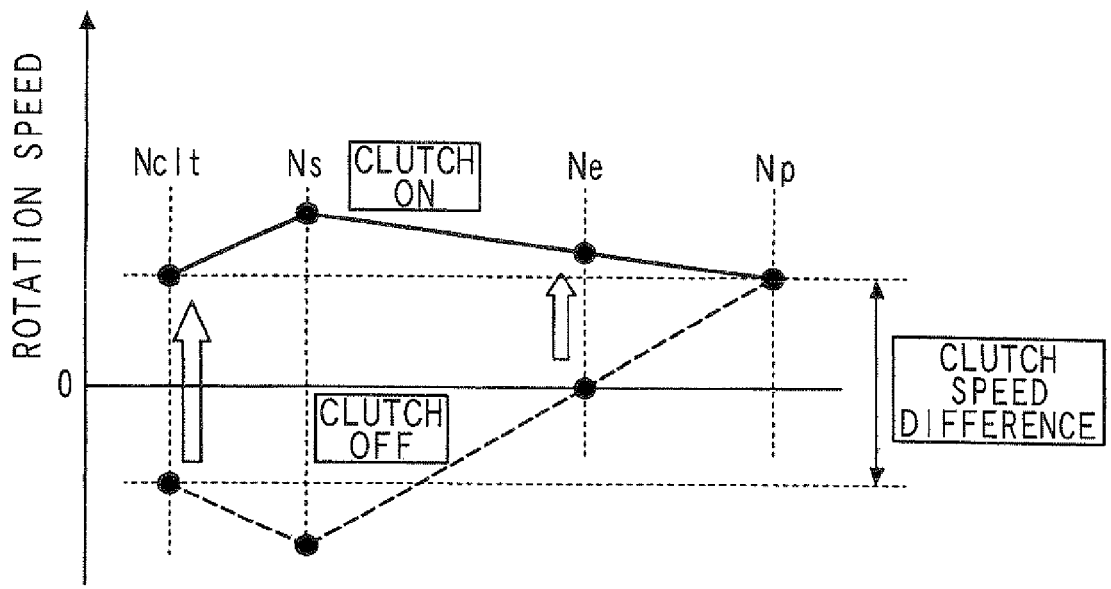
FIG. 3 is a collinear diagram showing a relation among rotation speeds of each part of the drive system.

As shown in FIG. 3, the rotation speeds Ns, Ne and Np are always on the same linear line in the collinear line diagram. The rotation speed Ns is the sun gear shaft rotation speed of the input side of the first drive power transfer shaft 17 (input shaft 17a of the CVT 19) coupled to the sun gear of the planetary gear set 16. The rotation speed Ne is the rotation speed of the crankshaft 13 of the engine 11 coupled to the carrier of the planetary gear. The rotation speed Np is the propeller shaft rotation speed of the propeller shaft 22, which rotates with the second drive power transfer shaft 18 coupled to the ring gear. The relation between the sun gear shaft rotation speed Ns (=rotation speed of the input shaft 17a of the CVT 19) and the rotation speed Nclt of the output shaft 17 of the CVT 19 (=rotation speed of the input shaft of the clutch 20) is varied in accordance with the transmission ratio of the CVT 19.

For example, as shown by a dotted line in FIG. 3, if the clutch 20 is turned off (drive power interruption condition) and the engine 11 is stopped (engine rotation speed Ne=0) under the vehicle travel condition (propeller shaft rotation speed Np>0), the sun gear shaft rotation speed Ns (=rotation speed of the input shaft 17a of the CVT 19) becomes negative (reverse rotation condition). As a result, the rotation speed Nclt of the output shaft 17b of the CVT 19 also becomes negative.

If the clutch 20 is turned on (drive power transfer condition), as shown by a solid line in FIG. 3, the rotation speed Nclt of the output shaft 17b of the CVT 19 (=rotation speed of the input shaft of the clutch 20) rises to the same rotation speed as the propeller shaft rotation speed Np (=the rotation speed of the output shaft of the clutch 20) and accordingly the sun gear shaft rotation speed Ns also rises. Thus, if the engine rotation speed Ne or the transmission ratio Rcvt of the CVT 19 is changed with the clutch 20 being in the turned-on condition, the propeller shaft rotation speed Np and the vehicle travel speed responsively change.

Figure 4:
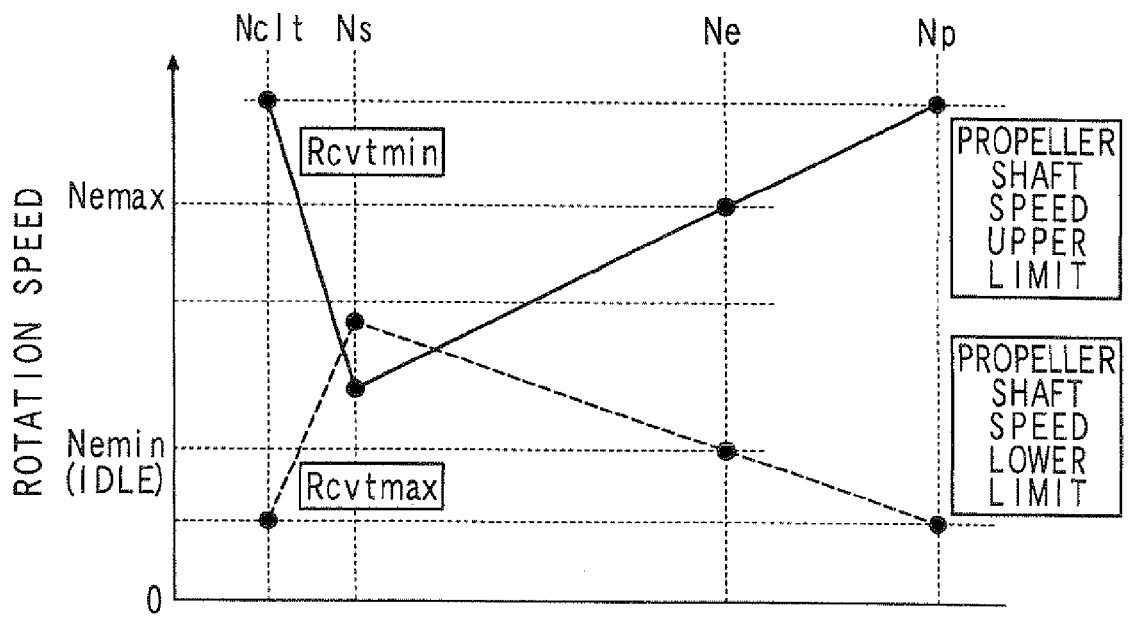
FIG. 4 is a collinear diagram showing a relation among a gear ratio of a continuously variable transmission unit, an engine speed and a vehicle speed.

In this case, as shown by the dotted line in FIG. 4, the lower limit value of the propeller shaft rotation speed Np and hence the lower limit value of the vehicle travel speed are determined in accordance with the maximum transmission ratio Rcvtmax of the CVT 19 and the minimum engine rotation speed Nemin (for example, idle rotation speed). Further, as shown by the solid line in FIG. 4, the upper limit value of the propeller shaft rotation speed Np and hence the upper limit value of the vehicle travel speed are determined in accordance with the minimum transmission ratio Rcvtmin and the maximum engine rotation speed Nemax.

When the clutch 20 is turned on (drive power transfer condition) from off (drive power interruption condition) under the condition that a clutch rotation speed difference, which is a difference between the rotation speeds of the input shaft and the output shaft of the clutch 20, is large, the propeller shaft torque (torque of propeller shaft 22) is varied suddenly causing uncomfortable torque variations.

The vehicle ECU 31 is therefore configured to execute control routines shown in FIG. 5 to FIG. 9, when the clutch 20 is turned from off to on. More specifically, the engine rotation speed Ne and the transmission ratio Rcvt of the CVT 10 are varied first to reduce the clutch rotation speed difference. The clutch 20 is then turned on, when the clutch rotation speed difference becomes smaller than a predetermined threshold value, that is, when the propeller shaft torque will not change suddenly even if the clutch 20 is turned on. Thus, the propeller shaft torque is restricted from changing suddenly when the clutch 20 is turned on.

More specifically, when the clutch 20 is to be turned from off to on, the engine 11 is started and the engine rotation speed command value Ne* is set to a predetermined value. This predetermined value may be set to the lowest engine rotation speed Nemin or to be slightly higher than that, 800 rpm for example.

The sun gear shaft rotation speed Ns is calculated as follows based on the planetary gear ratio ρ (ratio between numbers of teeth of the sun gear and the ring gear), the engine rotation speed Ne and the propeller shaft rotation speed Np.

$$Ns=\{(1+\rho)\times Ne-Np\}/\rho$$

The transmission command ratio Rcvt* is calculated as follows based on the sun gear shaft rotation speed Ns and the propeller shaft rotation speed Np.

$$Rcvt*=Ns/Np$$

Thus, by setting the engine rotation speed command value Ne* and the transmission ratio Rcvt* of the CVT 19, the engine 11 is controlled so that the engine rotation speed Ne attains the engine rotation speed command value Ne* and the CVT 19 is controlled so that its transmission ratio Rcvt attains the transmission ratio command value Rcvt*. The clutch rotation speed difference is thus minimized by changing the engine rotation speed Ne and the transmission ratio Rcvt of the CVT 19.

Further, the clutch rotation speed difference ΔNclt is calculated based on the transmission ratio Rcvt of the CVT 19, the planetary gear ratio ρ, the engine rotation speed Ne and the propeller shaft rotation speed Np as follows.

$$\Delta Nclt=Rcvt\times\{(1+\rho)\times Ne-Np\}/\rho-Np$$

The absolute value of the clutch rotation speed difference ΔNclt is compared with a predetermined threshold value N0 (for example, 180 rpm). If the absolute value of speed difference ΔNclt becomes smaller than the threshold value N0, it is assumed that the propeller shaft torque will not change suddenly even if the clutch 20 is turned on. Thus, the clutch-on command is generated and the clutch 20 is turned on.

The above-described control operation of the vehicle ECU 31 is described in more detail with reference to the control routines shown in FIG. 5 to FIG. 9.

(Drive Control Main Routine)

Figure 5:
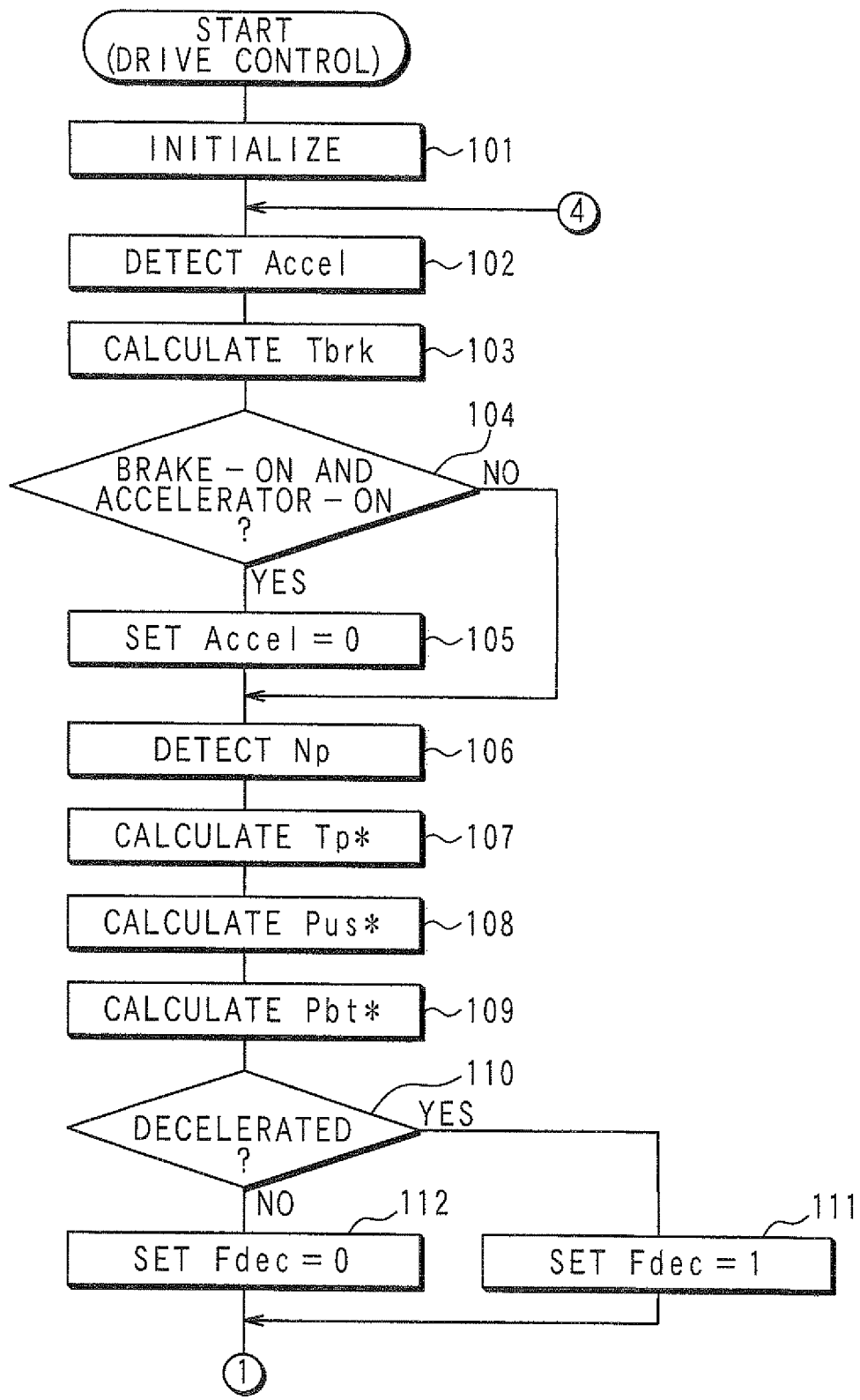
FIG. 5 is a flowchart showing a first part of a drive control main routine executed in the embodiment.
Figure 6:
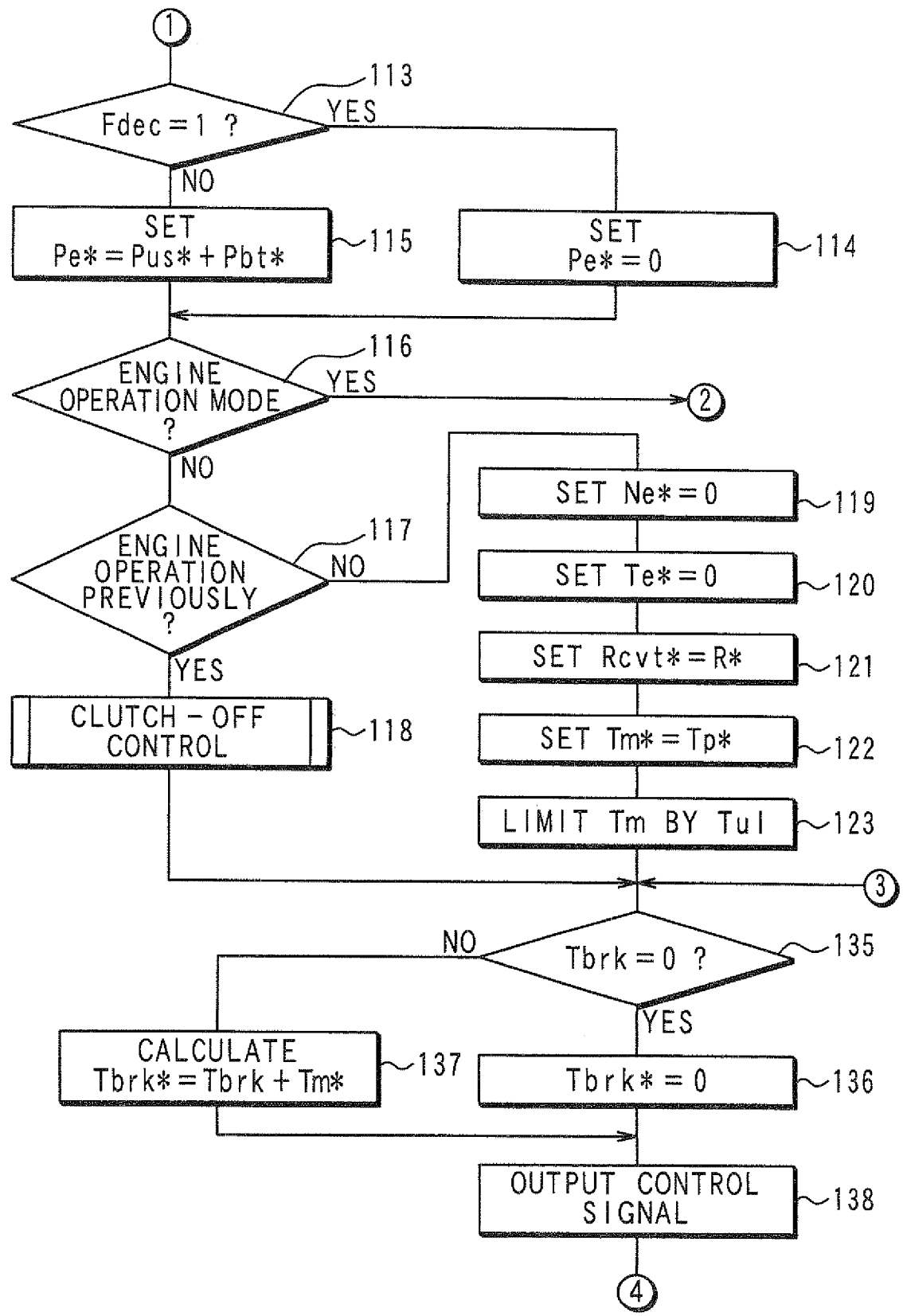
FIG. 6 is a flowchart showing a second part of the drive control main routine.
Figure 7:
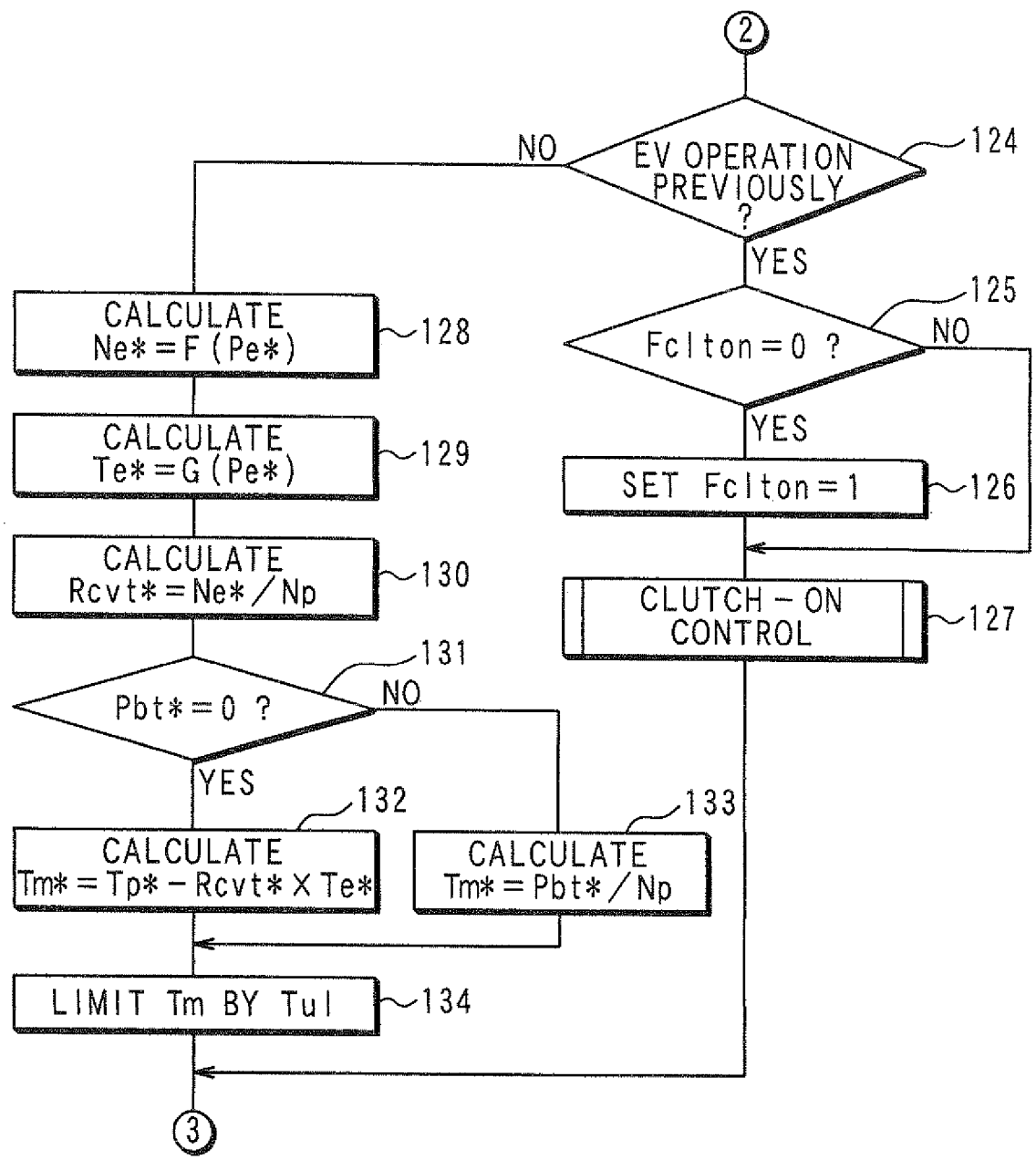
FIG. 7 is a flowchart showing a third part of the drive control main routine.

The drive control main routine shown in FIG. 5 to FIG. 7 is repeated at a predetermined interval while the electric power supply to the vehicle ECU 31 is maintained.

When this routine is started, first at step 101, initialization is executed thereby to set various control command values and control command signals are set to respective initial values. This initialization process of step 101 is executed only once when this routine is started immediately after the power supply to the vehicle ECU 31 is started.

At step 102, the accelerator position Accel is detected based on the output of the accelerator sensor 32. At step 103, the brake torque Tbrk is calculated based on the hydraulic fluid pressure of a brake device.

At step 104, it is checked whether the brake is operated, that is, brake-on (brake torque Tbrk≠0), and the accelerator is operated, that is, accelerator-on (accelerator position Accel≠0). If the check result indicates the brake-on and the accelerator-on, step 105 is executed to forcibly set the accelerator position to zero (0) thereby effecting braking with priority.

At step 106, the propeller shaft rotation speed Np of the propeller shaft 22 is detected based on the output of the vehicle speed sensor 35. At step 107, the propeller shaft torque command value TP* of the propeller shaft 22 is calculated based on the propeller shaft rotation speed Np and the accelerator position Accel and the like by using the mapped data or the mathematical equations.

At step 108, the travel power command value Pus* required for the vehicle to travel is calculated based on the propeller shaft torque command value Tp*, the propeller shaft rotation speed Np and the like based on the mapped data or the mathematical equations. At step 109, the charge power command value Pbt* required to charge the DC power source 28 is calculated based on the charge state SOC (=remaining power/fully-charged power) of the DC power source 28 and the like by using the mapped data or the mathematical equations.

At step 110, it is checked whether the vehicle is in deceleration, that is, the vehicle is in travel (propeller shaft rotation speed Np≠0) without the accelerator operation (accelerator position Accel=0). If the vehicle is in deceleration, a deceleration flag Fdec is set to "1" at step 111.

If the vehicle is not decelerated, that is, the vehicle is determined to be at rest (propeller shaft rotation speed Np=0) or the accelerator is operated (accelerator position Accel≠0) at step 110, the deceleration flag Fdec is reset to "0" at step 112.

At step 113 in FIG. 6, it is checked whether the vehicle is in deceleration (Fdec=1). If the vehicle is determined to be in deceleration, the engine power command value Pe* is set to zero (0) at step 114.

$$Pe*=0$$

If the vehicle is determined to be not in deceleration at step 113, the engine power command value Pe* is calculated by adding the charge power command value Pbt* to the travel power command value Pus* at step 115.

$$Pe*=Pus*+Pbt*$$

At step 116, it is checked whether a predetermined engine operation condition is satisfied based on the engine power command value Pe*, the propeller shaft rotation speed Np, the accelerator position Accel, the shift lever position and the like. That is, it is checked whether the vehicle is in the engine operation mode, in which the vehicle travels with engine only (engine-only operation mode) or with the engine assisted by the motor (assist operation mode), or in the EV operation mode, in which the vehicle travels with only the AC motor 12.

Figure 8:
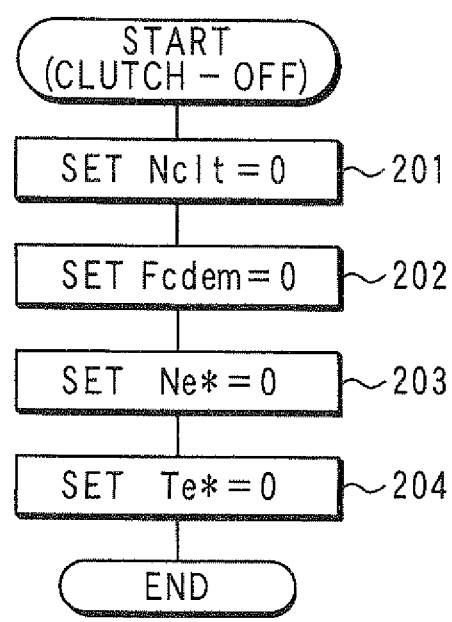
FIG. 8 is a flowchart showing a clutch-off control subroutine executed in the drive control main routine.

If it is determined at step 116 that it is not the engine operation mode, that is, the engine operation condition is not satisfied, the vehicle is assumed to be in the EV operation mode. At step 117, it is checked whether the vehicle was previously in the engine operation mode. If the vehicle was in the engine operation mode last time, it is determined that the operation mode is just changed from the engine operation mode to the EV operation mode. In this instance, the clutch-off control routine is performed as shown in FIG. 8, in which a clutch command flag Nclt is reset to "0" indicating a clutch-off command. Thus, the clutch 20 is turned from on (drive power transfer condition) to off (drive power interruption condition).

If it is determined at step 117 that the vehicle was not in the engine operation mode either last time, that is, the vehicle was in the EV mode last time as well, the engine rotation speed command value Ne* is set to zero (0) at step 119 and the engine torque command value Te* is also set to zero (0) at step 120.

At step 121, the transmission ratio command value Rcvt* of the CVT 19 is set to a predetermined value R*. At step 122, the motor torque command value Tm* is set to the propeller shaft torque command value Tp*. At step 123, the motor torque command value Tm* is limited to a predetermined upper limit value Tul, if the former Tm* exceeds the latter Tul.

Figure 9:
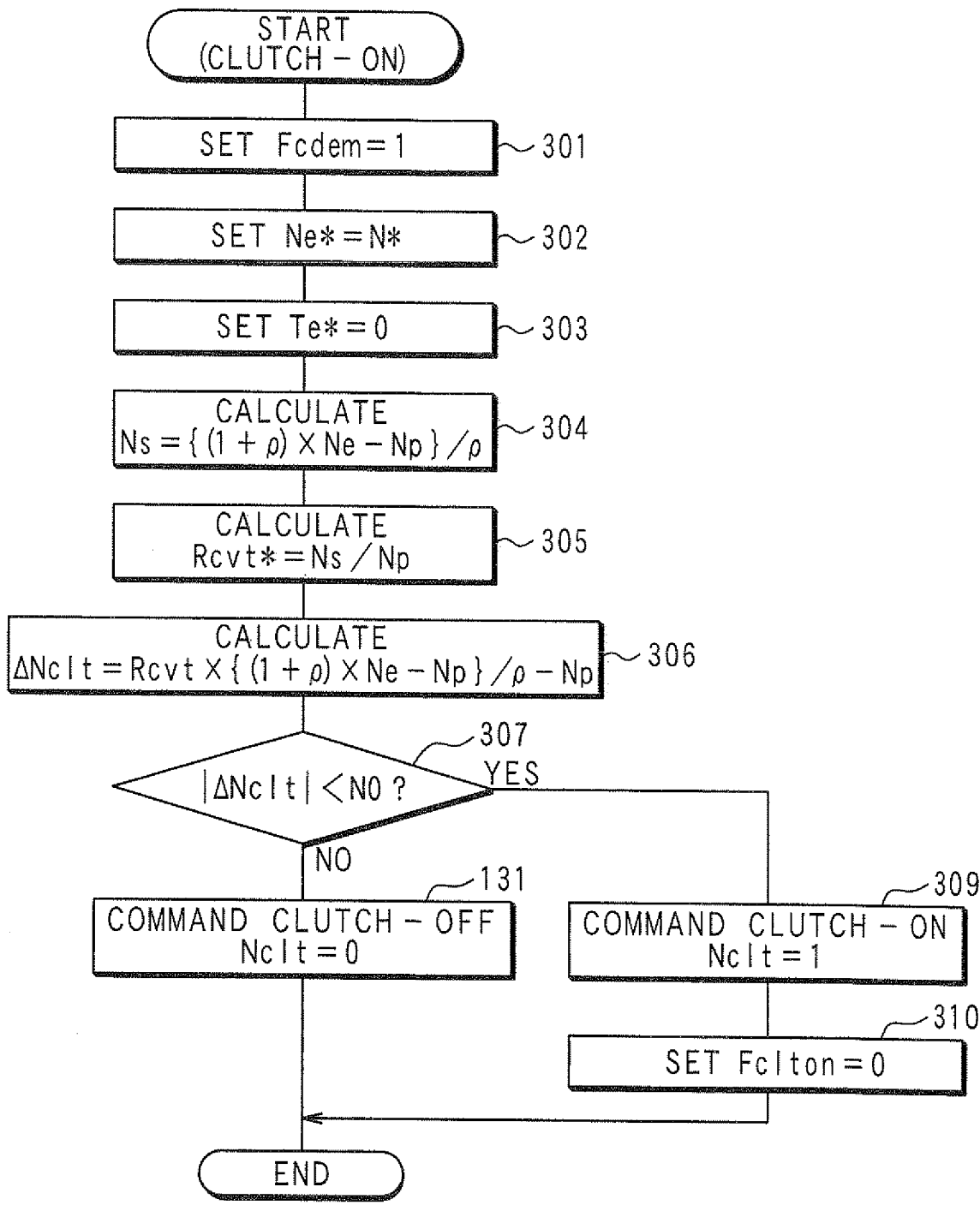
FIG. 9 is a flowchart showing a clutch-on control subroutine executed in the drive control main routine.

If it is determined at step 116 that the vehicle is in the engine operation mode, step 124 shown in FIG. 7 is executed to check whether the vehicle was previously in the EV operation mode. If the vehicle was in the EV operation mode last time, it is determined that the operation mode is just changed from the EV operation mode to the engine operation mode. At step 125, it is checked whether a clutch-on control flag is Fclton=0. If the clutch-on control flag Fclton is "0", the clutch-on control flag Fclton is set to "1" at step 126 and a clutch-on control routine shown in FIG. 9 is executed at step 127. In the clutch-on control routine, when the clutch rotation speed difference ΔNcl becomes smaller than the predetermined threshold value N0, the clutch command flag Nclt is set to "0" indicating a clutch-on command so that the clutch 20 is turned from off (drive power interruption condition) to on (drive power transfer condition).

If it is determined at step 124 that the vehicle was not in the EV operation mode last time either and was in the engine operation mode last time as well, step 128 is executed to calculate the engine rotation speed command value Ne* based on the engine power command value Pe* and the like. At step 129, the engine torque command value Te* is calculated based on the engine power command value Pe*.

At step 130, the transmission ratio command value Rcvt* of the CVT 19 is calculated as follows based on the engine rotation speed command value Ne* and the propeller shaft rotation speed Np.

$$Rcvt^*=Ne^*/Np$$

At step 131, it is checked whether the charge power command value Pbt* is zero (0). If the charge power command value Pbt* is zero, the motor torque command value Tm* is calculated as follows based on the propeller shaft torque command value Tp*, the transmission ratio command value Rcvt* and the engine torque command value Te*.

$$Tm^*=Tp^*Rcvt^* \times Te^*$$

If it is determined at step 131 that the charge power command value Pbt* is not zero, the motor torque command value Tm* is calculated based on the charge power command value Pbt* and the propeller shaft rotation speed Np as follows at step 133.

$$Tm^*=Pbt^*/Np$$

At step 134, the motor torque command value Tm* is limited to the predetermined upper limit value Tul, if the former Tm* exceeds the latter Tul.

After setting the engine rotation speed command value Ne*, the engine torque command value Te*, the transmission ratio command value Rcvt*, the motor torque command value Tm*, the clutch flag and the like as described above, step 135 shown in FIG. 6 is executed to check whether the brake is off (not operated and brake torque Tbrk=0). If the brake is not operated, the mechanical brake torque command value Tbrk* is set to zero (0) at step 136.

If it is determined at step 135 that the brake is operated (brake torque Tbrk≠0), the mechanical brake torque command value Tbrk* is calculated based on the brake torque Tbrk and the motor torque command value Tm* as follows.

$$Tbrk^*=Tbrk+Tm^*$$

At step 138, the various control command values and the control command signals are outputted to the corresponding ECUs 36 to 38, which responsively control the engine 11, the transmission unit 14 (CVT 19 and clutch 20), the AC motor 12, the brake device and the like.

(Clutch-Off Control Routine)

The clutch-off control routine shown in FIG. 8 is a sub-routine executed at step 118 in the drive control main routine shown in FIG. 5 to FIG. 7.

When this routine is started, the clutch command flag Nclt is reset to "0" indicating the clutch-off command at step 201. The clutch 20 is turned off to interrupt the drive power transfer from the CVT 17 to the AC motor 12 in response to this clutch-off command.

At step 202, a fuel supply flag Fcdem is reset to "0" indicating interruption of fuel injection, so that the fuel injection into the engine 11 is responsively stopped to stop the engine operation. At step 203, the engine rotation speed command value Ne* is set to zero (0). At step 204, the engine torque command value Te* is also set to zero (0), thus ending the sub-routine.

(Clutch-On Control Routine)

The clutch-on control routine shown in FIG. 9 is a sub-routine executed at step 127 of the drive control main routine shown in FIG. 5 to FIG. 7.

When this routine is started, the fuel supply flag Fcdem is set to "1" indicating fuel injection at step 301, so that fuel injection into the engine 11 is started to start the engine 11.

At step 302, the engine rotation speed command value Ne* is set to the predetermined value N* (for example 800 rpm). At step 303, the engine torque command value Te* is set to zero (0).

At step 304, the sun gear shaft rotation speed Ns is calculated as follows based on the planetary gear ratio ρ, the engine rotation speed Ne and the propeller shaft rotation speed Np as follows.

$$Ns=\{(1+\rho) \times Ne-Np\}/\rho$$

At step 305, the transmission command ratio Rcvt* of the CVT 19 is calculated as follows by using the sun gear shaft rotation speed Ns and the propeller shaft rotation speed Np.

$$Rcvt^*=Ns/Np$$

The engine rotation speed command value Ne* and the transmission ratio command value Rcvt* of the CVT 19 are set as described above. The engine 11 is controlled so that the engine rotation speed Ne attains the engine rotation speed command value Ne*. Further, the CVT 19 is controlled so that the transmission ratio Rcvt of the CVT 19 attains the transmission ratio command value Rcvt*. By thus controlling the engine rotation speed Ne and the transmission ratio Rcvt of the CVT 19, the clutch rotation speed difference is reduced.

At step 306, the clutch rotation speed difference ΔNclt is calculated as follows based on the transmission ratio Rcvt of the CVT 19, and the planetary gear ratio ρ, the engine rotation speed Ne and the propeller shaft rotation speed Np.

$$\Delta Nclt=Rcvt \times \{(1+\rho) \times Ne-Np\}/\rho-Np$$

At step 307, it is checked whether the absolute value of the clutch rotation speed difference ΔNclt is less than the predetermined threshold value N0 (for example 180 rpm). If the absolute value of the clutch rotation speed difference ΔNclt is greater than the predetermined threshold value N0, the clutch command flag Nclt is maintained at "0" indicating the clutch-off command, thus ending this routine.

At the time it is determined at step 307 that the absolute value of the clutch rotation speed difference ΔNclt became less than the threshold value N0, the propeller shaft torque will not suddenly change even if the clutch 20 is turned on. In this instance, at step 309, the clutch command flag Nclt is set to "1" indicating the clutch-on command so that the clutch 20 is turned on by the clutch-on command. At step 310, the clutch-on control flag Fclton is reset to "0," thus ending this sub-routine.

According to the above-described embodiment, the output drive power of the engine 11 is divided by the planetary gear set 16 and transferred to the first drive power transfer shaft 17 and the second drive power transfer shaft 18. The first drive power transfer shaft 17 is provided with the CVT 19 and the clutch 20. The output sides of both of the first drive power transfer shaft 17 and the second drive power transfer shaft 18 are coupled to the common output shaft 21, to which the rotation shaft of the AC motor 12 and the propeller shaft 22 are coupled.

The drive power of the engine 11 can be transferred to the propeller shaft 22 through the transmission unit 14 by turning the clutch 20 on (drive power transfer condition) so that the vehicle can travel in the engine operation mode (engine-only operation mode or the assist mode). The drive power transfer between the engine 11 and the propeller shaft 22 can be interrupted by turning the clutch 20 off (drive power interruption condition) so that the vehicle can travel in the EV operation mode or the regenerative braking mode efficiently without being affected by the friction loss of the engine 11.

Since the CVT 19 and the clutch 20 receive only a part of the drive power of the engine 11, which is divided by the planetary gear set 16, the CVT 19 and the clutch 20 can be reduced in size and the length of the transmission unit 14 can be shortened. Thus, the drive system of the electric vehicle can be reduced in size and cost to meet the recent demand. The drive system can be readily mounted in small- or compact-sized vehicles even though the mounting space is limited.

When the clutch 20 is turned from off to on, the engine rotation speed and the transmission ratio of the CVT 19 are first varied to reduce the clutch rotation speed difference of the clutch 20. Then, when the clutch rotation speed difference becomes less than the predetermined threshold value, the clutch 20 is turned on based on assumption that the turn-on of the clutch 20 will not cause a sudden change in the propeller shaft torque. As a result, the propeller shaft torque is surely restricted from changing suddenly at the time of turning on the clutch 20 and undesirable torque change is suppressed.

In the above-described embodiment, when the clutch 20 is turned from off to on, the clutch 20 is turned on after varying the engine rotation speed and the transmission ratio of the CVT 19. It is however possible to turn off the clutch 20 after varying conditions of the engine 11 (for example, engine rotation speed) and the CVT 19 (for example, transmission ratio), when the clutch 20 is turned from on to off.

In addition, in the embodiment, the CVT 19 and the clutch 20 are provided in the first drive power transfer shaft 17. It is however possible to provide the CVT 19 and the clutch 20 in the first drive power transfer shaft 17 and the second drive power transfer shaft 18, respectively.

When the vehicle changes its operation mode from the EV operation mode to the engine operation mode at a travel speed higher than a predetermined travel speed, the clutch rotation speed difference may be reduced by controlling the throttle position of the engine 11 so that the engine rotation speed attains the target rotation speed. According to this control, when the operation mode is changed from the EV operation mode to the engine operation mode, the clutch rotation speed difference can be reduced speedily. As a result, when the clutch 20 is turned on in timed relation with the change from the EV operation mode to the engine operation mode, the propeller shaft torque is restricted from changing suddenly.

It is also possible to start the engine 11 and control the clutch 20 to a half-clutch or semi-engaged condition (drive power is transferred by maintaining slipping between the input side and the output side), when acceleration is requested by operating the accelerator to more than a predetermined position under a low travel speed. According to this control, by controlling the clutch 20 to the half-clutch condition when the accelerator is operated to more than the predetermined position to accelerate the vehicle traveling at a speed lower than the predetermined speed, the drive power of the engine 11 can be applied to the propeller shaft 22 speedily to accelerate the vehicle while restricting sudden change of the propeller shaft torque.

It is possible to coordinately vary the engine torque command value Te* and the motor torque command value Tm* until the motor torque command value Tm* becomes zero (0) or near zero after turning the clutch 20 from off to on, when the operation mode of the vehicle is changed from the EV operation mode to the engine operation mode by turning the clutch 20 from off to on.

It is also possible to coordinately vary the engine torque command value Te* and the motor torque command value Tm* until the engine torque command value Te* becomes zero (0) or near zero after turning the clutch 20 from on to off, when the operation mode of the vehicle is changed from the engine operation mode to the EV operation mode by turning the clutch 20 from on to off. According to this control, the operation mode of the vehicle can be changed from the EV operation mode to the engine operation mode and from the engine operation mode to the EV operation mode without causing undesirable torque change.

Still further, it is possible to set the transmission ratio of the CVT 19 to increase the deceleration of the engine 11 in the course of stopping the engine 11 by turning the clutch 20 from on to off. According to this control, the engine 11 can be stopped speedily because load exerted on the engine 11 is increased in the course of stopping the engine 11.

What is claimed is:

1. A vehicle drive system comprising:
an internal combustion engine;
a drive power regulator mechanism provided in a drive power transfer path between the engine and a drive axle of a vehicle;
an electric motor/generator provided to transfer and receive drive power to and from the drive axle, respectively;
an electric power source provided to supply and receive electric power to and from the motor/generator, respectively; and
a control unit provided to control the engine, the regulator mechanism and the motor/generator based on an operating condition of the vehicle, wherein:
the regulator mechanism includes a planetary gear set as a drive power divider unit, a transmission unit and a switching unit, the divider unit dividing and transferring an output drive power of the engine to a first transfer path of drive power and a second transfer path of drive power, the transmission unit varying a transmission ratio between an input side and an output side of the first transfer path, and the switching unit transferring and interrupting drive power in the first transfer path or the second transfer path;

the output sides of the first transfer path and the second transfer path are coupled to a common output shaft;

a rotation speed of the input side of the first transfer path and a rotation speed of the output shaft are restricted by the transmission ratio when the switching unit is in a power transfer condition, and released from restriction by the transmission ratio when the switching unit is in a power interruption condition;

the control unit is configured to control a power transfer/interruption condition of the switching unit based on a required drive power of the engine;

the control unit is configured, when the switching unit is required to be switched from the power interruption condition to the power transfer condition, to set a rotation speed command value of the engine to a predetermined command value, calculate a transmission ratio command value of the transmission unit based on a rotation speed of the drive axle and the rotation speed of the input side of the first transfer path, which is calculated from a planetary ratio, a rotation speed of the engine and the rotation speed of the drive axle, the planetary ratio indicating a ratio between numbers of teeth of a sun gear and a ring gear of the planetary gear set;

the control unit is configured to vary the rotation speed of the engine and the transmission ratio of the transmission unit so that a rotation speed difference between the input side and the output side of the switching unit is reduced, by controlling the engine so that the rotation speed of the engine attains the rotation speed command value and controlling the transmission unit so that the transmission ratio of the transmission unit attains the transmission ratio command value; and the control unit is configured, when the rotation speed difference is reduce to be smaller than a predetermined difference value to switch over the switch unit from the power interruption condition to the power transfer condition.

2. The vehicle drive system according to claim 1, wherein:

the control unit is configured to calculate the rotation speed difference based on the transmission ratio of the transmission unit, the planetary ratio of the planetary gear set, the rotation speed of the engine and the rotation speed of the drive axle.

3. The vehicle drive system according to claim 1, wherein:

the control unit is configured to reduce the rotation speed difference by controlling the rotation speed of the engine to a target rotation speed by throttle control, when an operation mode of the vehicle is changed from a first operation mode, in which the vehicle travels with only the drive power of the motor/generator above a predetermined vehicle speed, to a second operation mode, in which the vehicle travels with only the drive power of the engine or both of the drive powers of the engine and the motor/generator.

4. The vehicle drive system according to claim 1, wherein:

the control unit is configured to start the engine and control the switching unit to a semi-power transfer condition, when acceleration of the engine is requested under a vehicle travel speed less than a predetermined speed and an accelerator position being more than a predetermined position.

5. The vehicle drive system according to claim 1, wherein:

the control unit is configured to change coordinately a torque command value of the engine and a torque command value of the motor/generator until one of the torque command values of the engine and the motor/generator is reduced to zero after the condition of the switching unit is changed.

6. The vehicle drive system according to claim 1, wherein:

the control unit is configured to set the transmission ratio of the switching unit to increase deceleration of the engine in a process of stopping the engine by controlling the switching unit from the power transfer condition to the power interruption condition.

7. The vehicle drive system according to claim 6, wherein:

the control unit is configured to set the transmission ratio to a larger ratio to increase the deceleration of the engine.

* * * * *